(12) United States Patent
Mertens et al.

(10) Patent No.: US 8,397,375 B2
(45) Date of Patent: Mar. 19, 2013

(54) MODULAR TRANSFER SYSTEM FOR WORKPIECES

(75) Inventors: Karl-Heinz Mertens, Friedberg (DE); Peter Meier, Frankfurt/M (DE); Detlef Gockel, Eschborn (DE)

(73) Assignee: Continental Teves AG & Co. oHG (DE)

( * ) Notice: Subject to any disclaimer, the term of this patent is extended or adjusted under 35 U.S.C. 154(b) by 899 days.

(21) Appl. No.: 11/547,538

(22) PCT Filed: Mar. 29, 2005

(86) PCT No.: PCT/EP2005/051417
§ 371 (c)(1),
(2), (4) Date: Sep. 3, 2008

(87) PCT Pub. No.: WO2005/095049
PCT Pub. Date: Oct. 13, 2005

(65) Prior Publication Data
US 2009/0012642 A1    Jan. 8, 2009

(30) Foreign Application Priority Data

Mar. 30, 2004  (DE) .......................... 10 2004 016 086
Jun. 18, 2004  (DE) .......................... 10 2004 029 665

(51) Int. Cl.
*B23P 21/00* (2006.01)

(52) U.S. Cl. .................................................... 29/711

(58) Field of Classification Search .................... 29/711, 29/712; 198/345.3, 349.5
See application file for complete search history.

(56) References Cited

U.S. PATENT DOCUMENTS

| | | | |
|---|---|---|---|
| 4,492,297 A | 1/1985 | Sticht | |
| 5,539,975 A * | 7/1996 | Kukuljan et al. | 29/701 |
| 5,920,974 A * | 7/1999 | Bullen | 29/33 K |
| 6,122,821 A * | 9/2000 | Dornieden et al. | 29/791 |
| 6,804,880 B2 * | 10/2004 | Yamamoto | 29/700 |
| 2002/0084701 A1 | 7/2002 | Mayer et al. | |
| 2003/0127124 A1 * | 7/2003 | Jones et al. | 136/244 |

FOREIGN PATENT DOCUMENTS

| | | |
|---|---|---|
| DE | 37 30 972 A1 | 3/1989 |
| DE | 41 17 439 C2 | 12/1992 |
| DE | 197 29 369 A1 | 1/1999 |
| DE | 199 57 382 A1 | 6/2001 |
| EP | 0 409 190 A2 | 1/1991 |

OTHER PUBLICATIONS

Transfer System MTS 2 Increases Productivity, Invest Report, Jan. 1999.

* cited by examiner

*Primary Examiner* — David Bryant
*Assistant Examiner* — Moshe Wilensky
(74) *Attorney, Agent, or Firm* — RatnerPrestia

(57) ABSTRACT

A modular transfer system for workpieces. Workpiece carriers are positioned in a manufacturing module with the same CNC (x-y) axis systems and the same servo drives the workpiece carrier and transfers such between modules. A separate conveyor belt is thus not required for the transfer.

22 Claims, 6 Drawing Sheets

MODULAR TRANSFER SYSTEM FOR WORKPIECES

This application is the U.S. national phase application of PCT International Application No. PCT/EP2005/051417, filed Mar. 29, 2005, which claims priority to German Patent Application No. DE 10 2004 016 086.4, filed Mar. 30, 2004, and German Patent Application No. DE 10 2004 029 665.0, filed Jun. 18, 2004.

BACKGROUND OF THE INVENTION

1. Technical Field

The present invention relates to a modular transfer system for workpieces.

2. Description of the Related Art

Transfer systems of this type, also referred to as transfer lines, are known in the art. The Invest Report 1/1999, page 11, of Messrs. Bosch discloses the transfer system MTS 2, for example. Transfer system MTS 2 has a modular design and comprises fully operable units with automatic stations and manual workplaces. Fully operable modules as regards mechanics, control, as well as the electric and pneumatic installation within complete function groups are provided, which are interconnected by means of three plug connectors for the installation. The transport of workpiece carriers is carried out using a conveyor belt, and each module of the transfer system is equipped with its own motor for driving the conveyor belt.

SUMMARY OF THE INVENTION

An objective of the invention involves providing a transfer system, which permits a still higher rate of flexibility. Although prior art transfer systems offer a certain degree of flexibility in the erection of transfer lines, an objective is to still further improve the modular design in such a fashion that even resetting operations for other manufacturing processes or completely new workpieces can be carried out quickly and simply, especially as regards the workpiece carrier transport between manufacturing modules.

Further details of the invention can be seen with respect to the description and the drawings.

BRIEF DESCRIPTION OF THE DRAWINGS

The Figures show in each case a perspective view, scaled down, of the essential aspects of a modularly designed automatic manufacturing and assembly system based on a transfer system having manufacturing modules identical in their leading dimensions and with corresponding stations, which can be used especially for non-cutting but principally also for metal-cutting machining processes. More specifically.

DETAILED DESCRIPTION OF THE PREFERRED EMBODIMENTS

Figure 1:
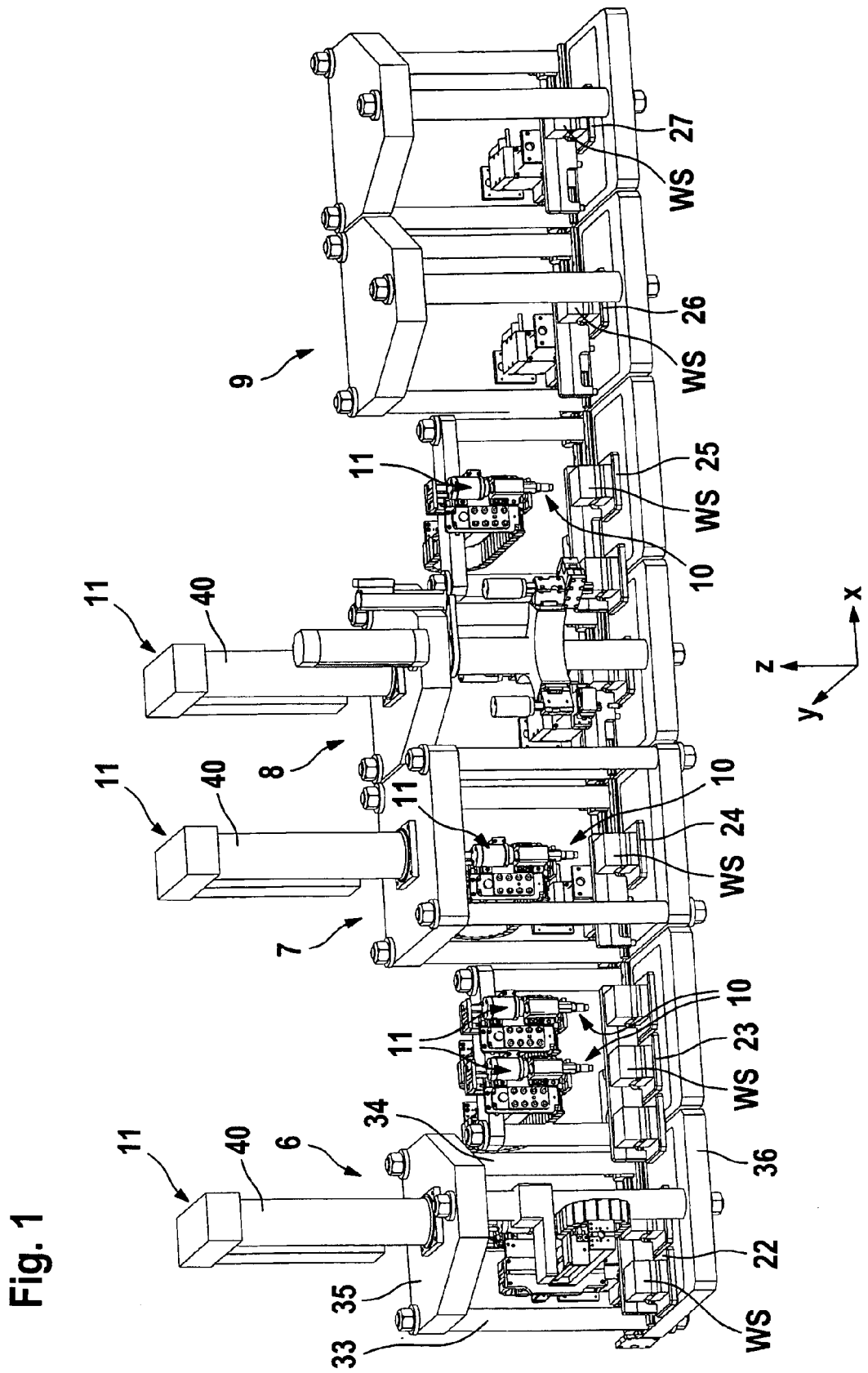
FIG. 1 is an isometric view of a transfer system in accordance with an embodiment of the present invention.
Figure 2:
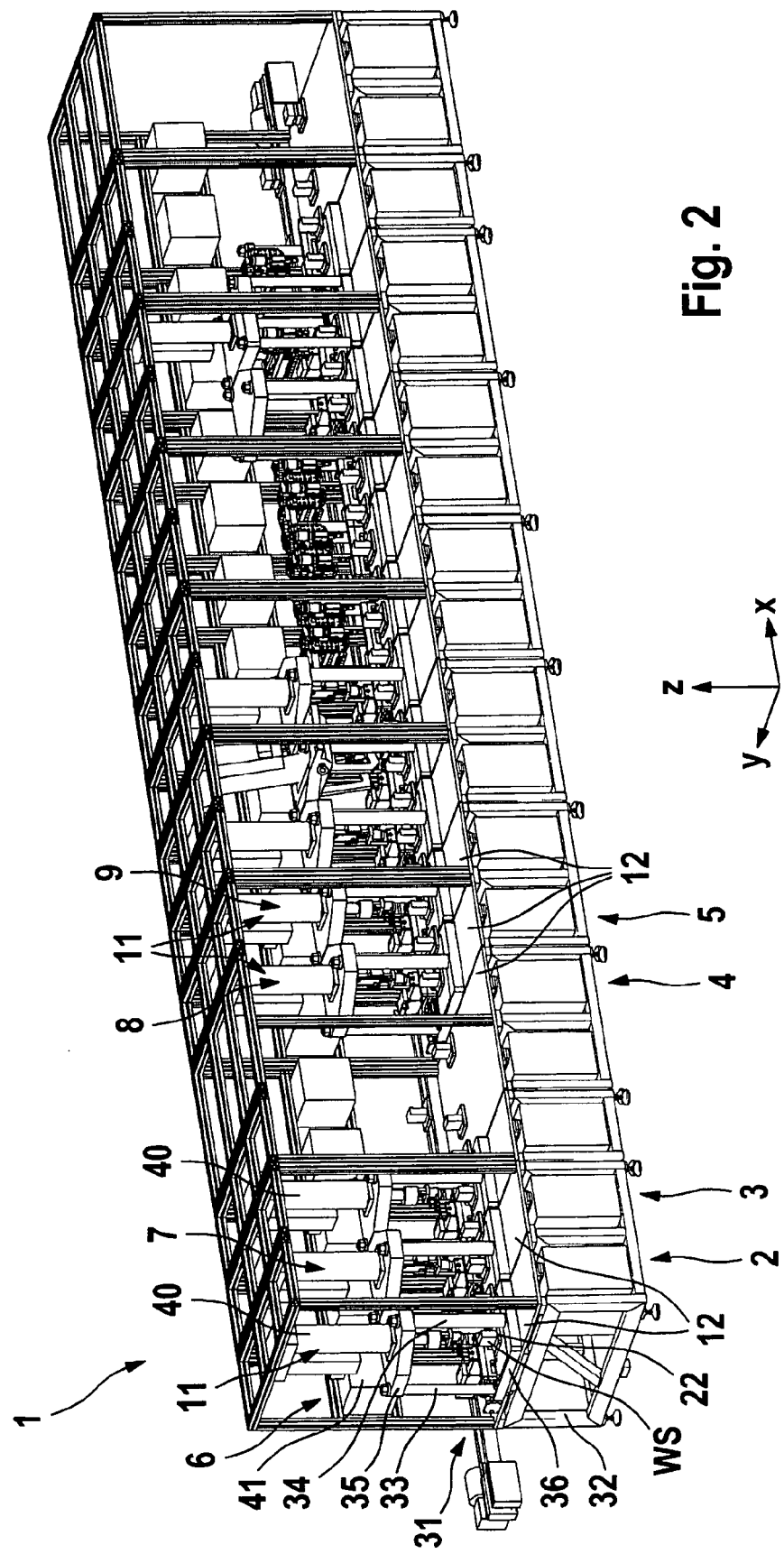
FIG. 2 is an isometric view of a transfer system in accordance with another embodiment of the present invention.
Figure 3:
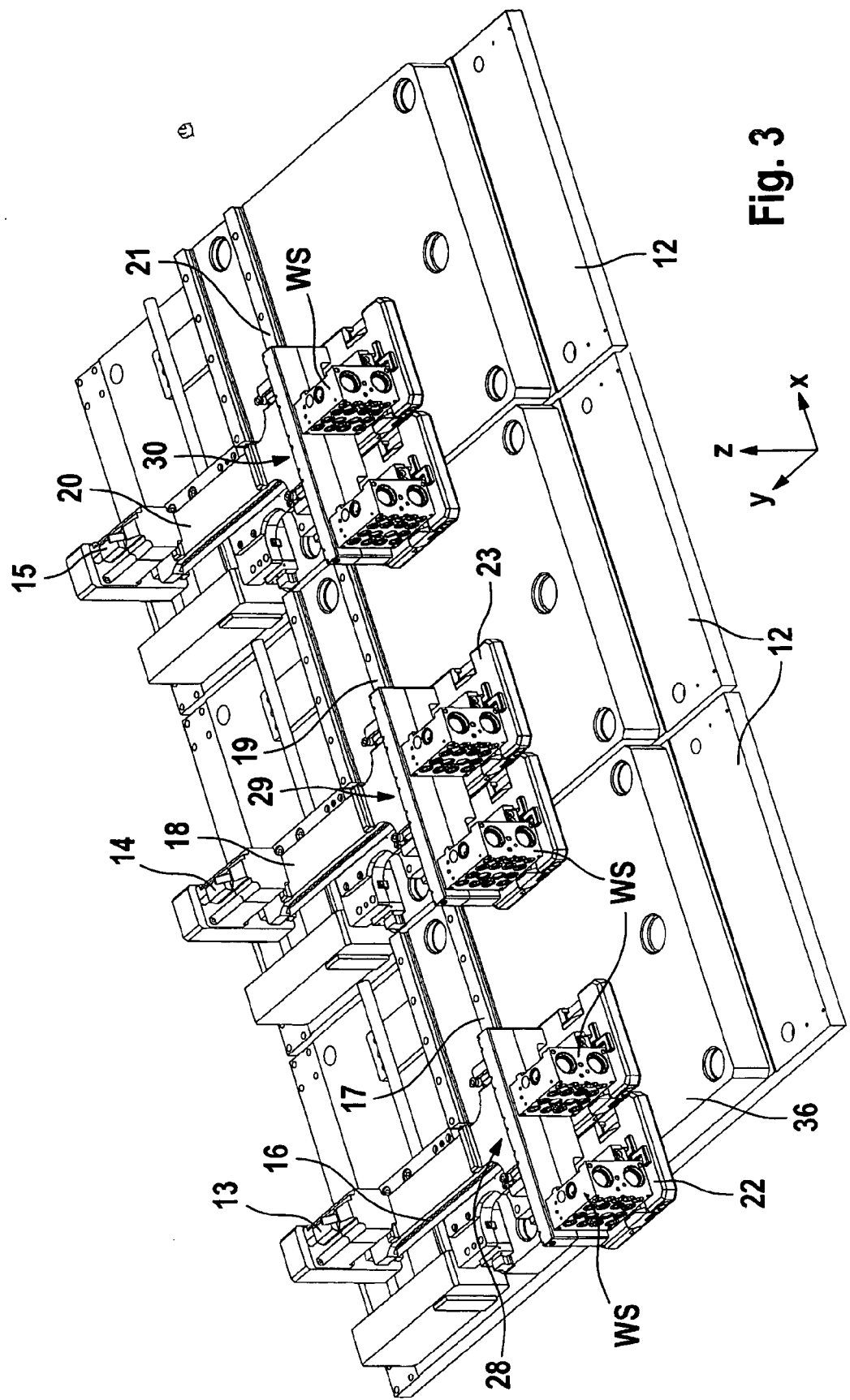
FIG. 3 is an isometric view illustrating exemplary modules of an embodiment of the present invention.
Figure 4:
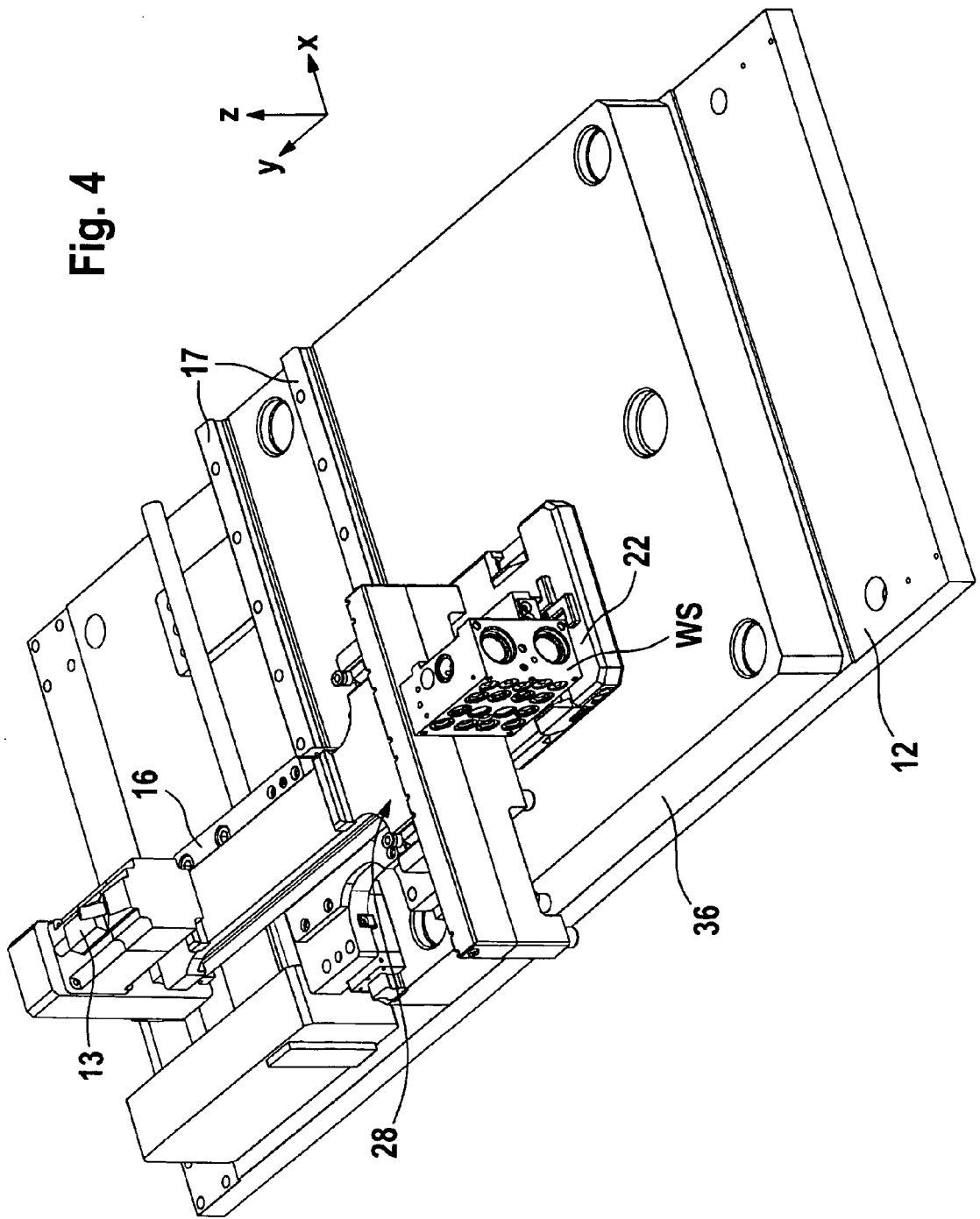
FIG. 4 is an isometric view illustrating an exemplary module of an embodiment of the present invention.
Figure 5:
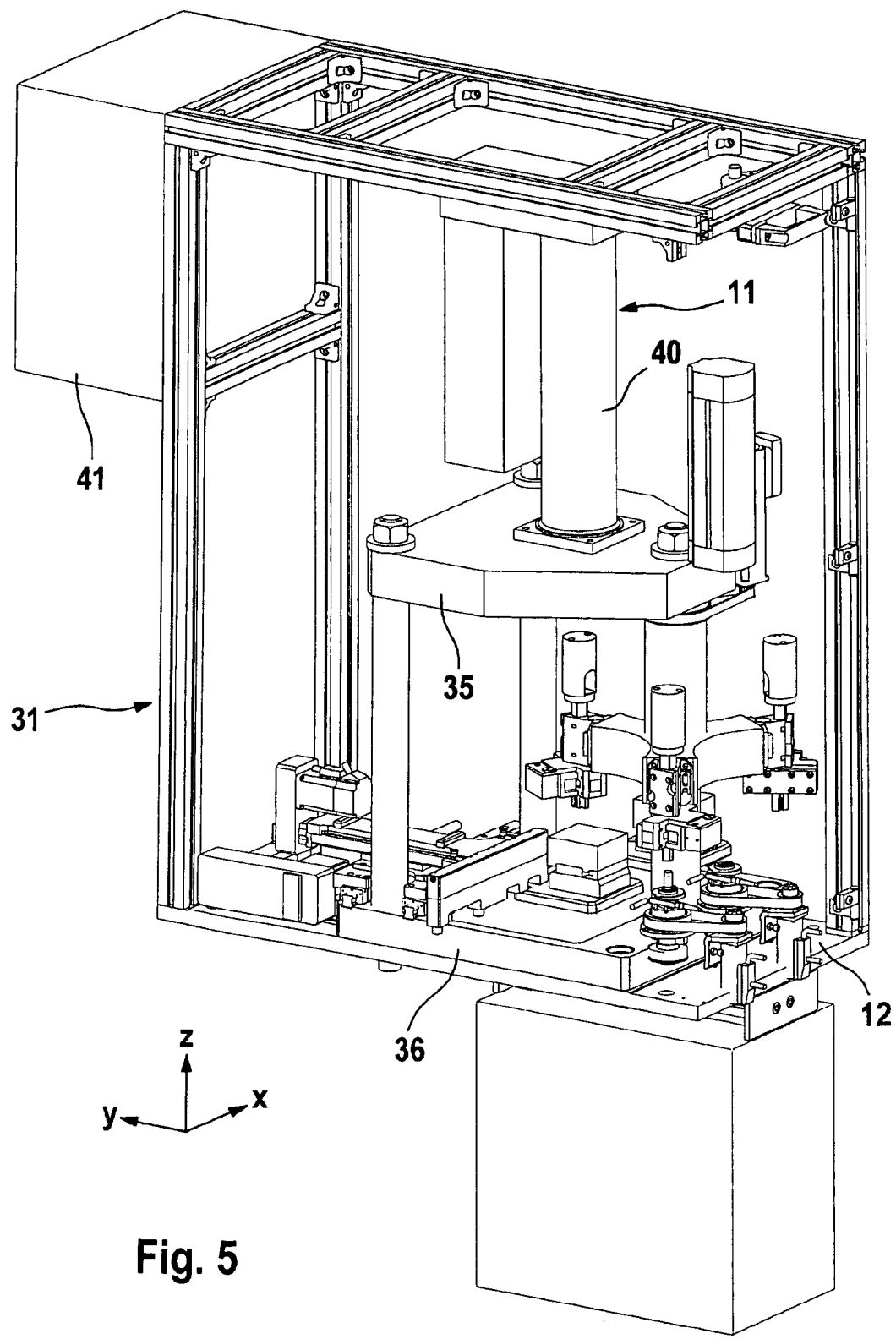
FIG. 5 is an isometric view illustrating an exemplary module of another embodiment of the present invention.

The modules have a uniform design and are standardized in terms of their leading dimensions. For the simple variation of the system, height and depth of the modules are identical, while their width can differ in general. For example, narrow modules can be designed, which perform less complex operations such as a transfer movement to the side. Therefore, the width (510 mm) of 'narrow' modules of this type principally can be dimensioned to be smaller than, preferably roughly half as large as, the width (1020 mm) of a standard module.

A minimum of two and a maximum of as many manufacturing modules as desired may be combined.

A module is basically composed of a table (table board with a profile base), on which slide elements of a workpiece carrier can slide in a low-friction and nevertheless stable manner so that machining forces can be introduced in the z-main axis direction directly into the table. Forces that act in the x-y-main axis direction are caught by the servo drives or self-locking gears preceding the drives.

Means for the energy supply and information supply as well as for the communication are provided between the individual manufacturing modules as well as for crosslinking to a superior electronic control station. The means are of the electric, hydraulic and/or pneumatic type. The necessary energy and signal lines are placed at standardized locations in all manufacturing modules and preferably integrated into the profile base. The lines can simply be interconnected by means of plug connectors and, if required, can be detached again so that modifications of the layout of the transfer line system can be performed in a simple manner.

Arranged above the table is a frame, which allows providing the modules with doors, walls, or similar elements so that the machining space offers a clean, noise-abated and fail-safe atmosphere for passage and machining of the workpieces. Measures for keeping the air clean (particle filtering) are possible in order to avoid contaminants and inadvertent clogging-up of the fine bores.

Each manufacturing module comprises one or more, preferably stationary, tool holding fixtures with servo drives. The term 'stationary' refers to the x-y main axis direction and implies in the respect that the tool-holding fixture, for example for an exchange of tools, can be moved in the x-y main axis direction. However, displacements in the x- and y-direction can be performed by the workpiece within the limits of workpiece processing. The tool is fixed in this plane.

Stations 1, 2, 3, 4, 5, which include a tool slide-in unit, are disposed on the table. The tool relates e.g. to a pressing, punching or bending tool, which is movable in the z-main axis direction by means of a drive or actuator. A column mount comprises an actuator (e.g. electric power-assisted press, hydraulic press, pneumatic-hydraulic press and/or jointer module with tools) operating preferably vertically in the z-main axis direction and being provided for exchangeable machining tools. In a favorable manner, the actuators are configured as hydraulically, pneumatically or electrically/electromagnetically driven piston-and-cylinder assemblies. This allows pressing, jointing and machining processes to be performed in the z-main axis direction (vertical direction) from the top to the bottom. Other, alternative fitments or equipments of the modules such as repositioning means or like elements are feasible.

For feeding into the transfer system, the workpieces are placed in a defined manner on a workpiece carrier and fixed thereon for machining purposes. The workpiece carrier can be displaced in the way of a slide on the table in the x-y main axis direction. A two-axis CNC-system with the servo drives and with guides for the defined feeding motion of the workpiece carrier including workpiece is used for the displacement within the machining space. The servo drives will thus ensure a defined positioning and feeding motion for machining workpieces WS, and further fix a corresponding position during the machining process. Further, the servo drives in each case are used for the transfer of the workpiece carrier from one manufacturing module to the other. For this purpose, holding means (index gripping devices), which hold (one or more) workpiece carriers in a defined manner, draw them into the manufacturing module, displace them inside the working space to the desired positions (1 to n positions within the machining space of a manufacturing module are feasible), and transfer the workpiece carrier including workpiece WS from a current manufacturing module to a subsequent manufacturing module for further machining and processing operations. Consequently, there is no need for a belt band, which is susceptible to maintenance and wear, for the workpiece transfer.

In view of the operation of the transfer line system, reference is made to the applicant's German patent application, which is not prior published and entitled 'Workpiece machining method for a transfer system and device for implementing the method' having an identical application and priority date, the contents of disclosure of which is included in its full scope. This applies in particular with respect to a return motion of workpiece carriers and for the configuration of workpiece carriers. The return motion of workpieces and workpiece carriers can be carried out using a conveyor belt, which is provided on a rear side of the transfer line system, as can be taken schematically from the above-mentioned patent application.

Of course, each manufacturing module is equipped with switches and/or sensors for gathering data related to machines, tools and workpieces, which connect to at least one local electronic controlling and regulating unit for the drives. The transducers, switches, and sensors are used to inquire positions, occupancies and other information, which can be processed in the control, the machine protection or for the operator protection. A local controlling and regulating unit with an integrated machine protection imparts a completely self-supporting function to each manufacturing module. Advantageously, this fact renders each manufacturing module easily exchangeable, what relates especially to the handling of the workpiece carrier. Due to the principally equal and optionally even identical design of the manufacturing modules, it is even possible to arrange them flexibly at any location desired within the transfer system.

Although the control as well as the safety devices are provided for each module in a self-supporting manner, they communicate with each other in a module-overlapping fashion. This means that each manufacturing module is always informed about at least the status, state of processing, or similar facts as regards adjacent manufacturing modules. In case of need, a picture taking means is employed in each manufacturing module, the information of which is processed in the electronic control, machine protection, operator protection for the purposes referred to hereinabove.

In general, the transfer system is appropriate for use in all metal-cutting and non-cutting machining processes, which are relevant in terms of series production. These are, for example: calking, punching, shaping, riveting, cementing, welding, placing, chipping, measuring, testing, and many more. The transfer system, however, is especially well suited for making pump bores, because they can be manufactured with the same tool in terms of identical diameters, or e.g. for so-called ball-type engagements, where a hard roller bearing ball made of roller bearing steel is pressed into a bore of an accommodating member made of a comparatively soft material. This is done in order to obtain an inexpensive, pressure-fluid-tight closure of the bore in this way. Another potential application relates to so-called clinched engagements for electromagnetically operable valve housings, pump bushings, covers, or similar elements.

FIG. 1 shows a favorable embodiment of a transfer system 1 having the shape of an automatic manufacturing and assembly line. An arrangement of this type with several interlinked modules 2, 3, 4, 5 is also called 'layout' and comprises manufacturing modules 6, 7, 8, 9 for preferably non-cutting and, as the case may be, metal-cutting machining processes. The modules are identical in terms of their leading dimensions as well as especially regarding mechanical or electric connecting means. A minimum of two and a maximum of as many modules 2, 3, 4, 5 as desired, arranged in series connection, may be provided without departing from the spirit of the invention.

Each manufacturing module 6, 7, 8, 9 comprises a table 12 for accommodating machining forces and one or more stationary tool holding fixtures 10 with an actuator as a drive for tool movement. The term 'stationary' refers to the respectively illustrated x-y main axis direction and implies in this connection that the tool holding fixture 10 can change its place exceptionally (e.g. for an exchange of tools or for fetching ready-to-mount components from a storage unit (not shown), a sorter, or the like). For the direct machining process, however, the necessary conveying movements in the x- and y-main axis directions are performed exclusively by the workpiece WS.

It is self-explanatory that each manufacturing module 6, 7, 8, 9 is equipped with switches and/or sensors (not shown in detail) for recording and monitoring processes and/or data related to machines, tools and workpieces, which connect to at least one local electronic controlling and regulating unit 41 for servo drives 13, 14, 15. The large number of transducers, sensors and switches are used to inquire positions, occupancies, etc., and serve among others for the machine protection as well as the operator protection. These safety devices (machine protection) and the control takes place in a module-overlapping fashion. That means that a control station (IPC control) is able to control and monitor several manufacturing modules 6 to 9 and their safety devices. If necessary, each manufacturing module 6 to 9 still comprises a picture taking means. The electric components connect to a local electronic controlling unit that is integrated into the module 2 to 5. This type of construction renders each manufacturing module 6 to 9 principally fully self-supporting, what relates especially to the handling of the workpiece carrier. Due to the principally equal and optionally even identical design of the manufacturing modules 6 to 9, it is even possible to arrange the manufacturing modules 6 to 9 principally at any location desired within the transfer system 1, and programming can be loaded by a superior control station.

Further, there are means for the energy supply and the supply with information as well as communication between the individual manufacturing modules 6, 7, 8, 9 and for crosslinking to a superior electronic control station. For the first-time programming of a local electronic control, it is possible for a superior control station to load a corresponding program with the working steps as described hereinabove.

The servo drives 13, 14, 15 for slides 28, 29, 30 are used to transfer workpiece WS together with workpiece carrier 22 to 27 from manufacturing module 6 to 9 to manufacturing module 6 to 9. However, there are still further functions, what represents the special advantage of the invention. This is because another objective relates to the positioning and feeding movement of the workpiece WS during the machining processes. More specifically, the servo drives 13, 14, 15 not only serve for the transfer of the workpiece WS using workpiece carriers 22 to 27 from manufacturing module 6 to 9 to manufacturing module 6 to 9, but also to perform feed movements for machining the workpieces WS. This double function economizes at least one conventional conveyor belt. A slide 28, 29, 30 with its holding means (index gripping devices) indexes the workpiece carrier 22 to 27, draws it into a manufacturing module 6 to 9, displaces it within the manufacturing module 6 to 9 into the respectively necessary machining position (1 to n positions within the machining space of a manufacturing module 6 to 9 are feasible), and transfers the workpiece carrier 22 to 27 including workpiece WS from a current manufacturing module 6 to 9 to a subsequent manufacturing module 6 to 9 for further machining and processing operations.

Pressing, jointing and machining processes can be performed in a z-main axis direction from the top to the bottom. Drives 11 are provided for this purpose, which are preferably configured as hydraulically, pneumatically or electrically/electromagnetically driven piston-and-cylinder assemblies 40. During the machining process, the workpieces WS are put down on the workpiece carrier 22 to 27 in a defined fashion (they are preferably clamped on the workpiece carrier 22 to 27), which is positioned in a defined manner within the machining space. The workpiece carrier 22 to 27 abuts on the table 12 so that the table 12 accommodates the machining forces in the z-main axis direction.

Figure 6:
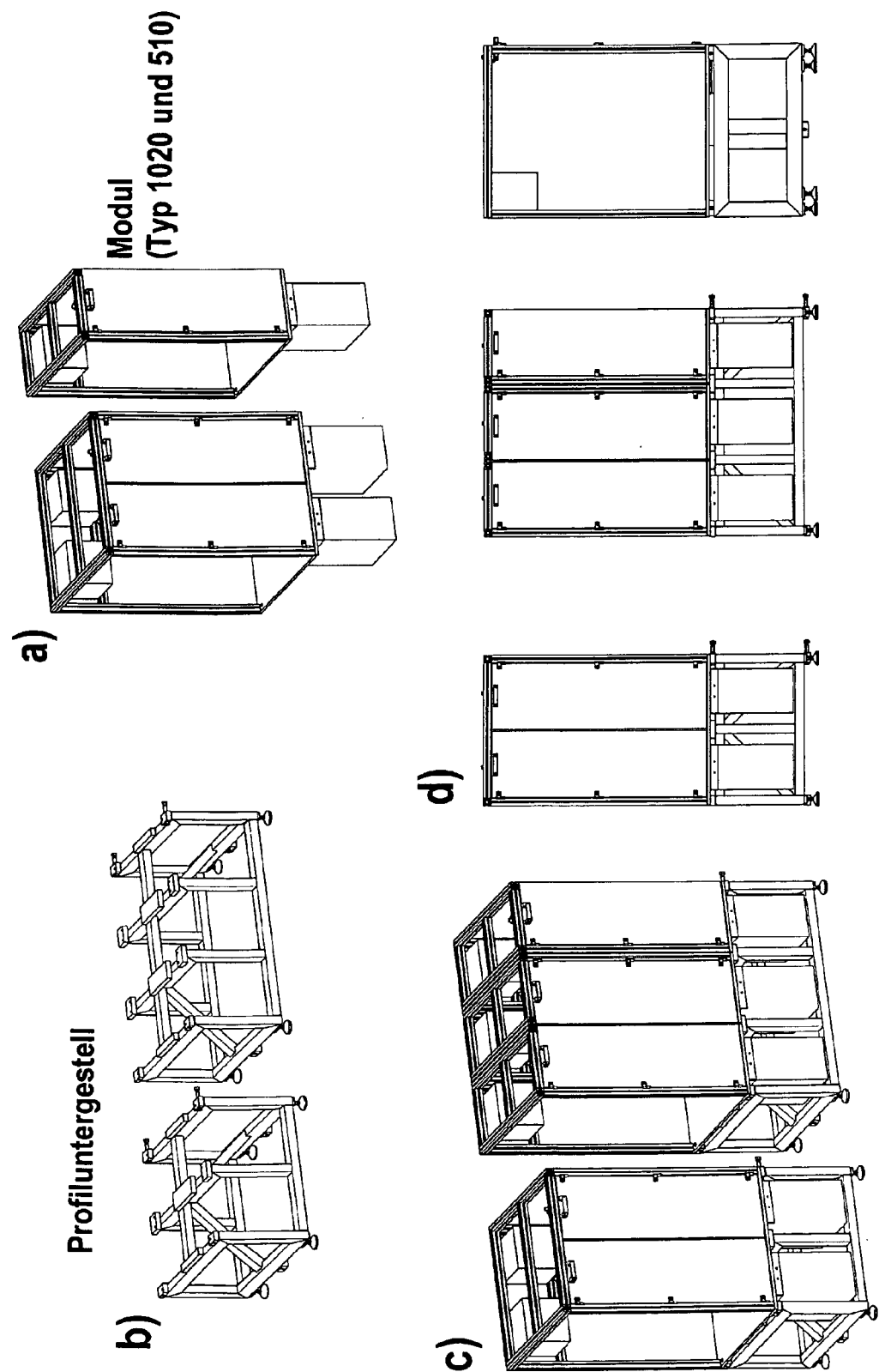
FIG. 6 includes isometric views of exemplary frame and support structures in accordance with at least one embodiment of the present invention.

The basic design of a module 2 to 5 consists of the manufacturing module 6 to 9 with table 12 (table board with profile base), on which plate-shaped workpiece carriers 22 to 27 with sliding coatings can slide in the x-y main axis direction, and where machining forces can be introduced in the z-main axis direction directly into the table 12. In the x-y-main axis direction, forces are introduced via the interposed servo drive units 13 to 15, which can be designed with or without drives. A self-locking gear may be advantageous which reduces the necessary holding moments. The design of a manufacturing module 6 to 9 favorably is as follows: Situated on the table 12 is a frame 31 with a column mount and an actuator for machining tools that operates vertically in the z-main axis direction (e.g. electric servo press, hydraulic press, pneumatic-hydraulic press and/or jointing module with tools). The modules 2 to 5 as well as the manufacturing modules 6 to 9 have a uniform design and are standardized in terms of their leading dimensions. For the simple variation of the transfer system 1, height and depth of the modules are identical, while their width can differ. Especially extra-wide modules with a uniform multiple of the width or narrow modules with a uniformly reduced width are possible. For scaling the width, integral multiple (e.g. double standard width) or corresponding reduction factors (e.g. half the standard width) are advisable. FIG. 6 exhibits, for example, narrow modules (Type 510 having a width of 510 mm) with a modular dimension, the width of which is half as large as the width of a standard module (Type 1020 with a width of 1020 mm).

In general, the transfer system 1 is appropriate for use in all metal-cutting and non-cutting machining processes, which are relevant in terms of series production. These are, for example: ball-type engagement, calking, punching, shaping, riveting, cementing, welding, placing, chipping, measuring, testing, and many more.

The invention inheres the following:

Transport of a workpiece carrier 22 to 29 with workpiece WS occurs in each manufacturing module 6 to 9 in a completely self-supporting manner.

The positioning of the workpiece carriers 22-29 within the respective manufacturing module 6 to 9 is performed with the same CNC-(x-y) axis system and with the same servo drives 13 to 15 as the workpiece carrier transfer. There is no need for a separate conveyor belt for the transfer.

Indexing of workpiece carriers 22 to 27 is executed by the CNC-axis system using an index gripping device. The index gripping device makes catch at the workpiece carrier 22 to 27 in a defined manner. There is no need for an additional index lifting apparatus.

Machining forces (pressing, calking, etc.) are introduced in a vertical direction directly via the workpiece carrier 22 to 27 into the flat table 12. There is no need for an additional lifting or supporting apparatus.

The workpiece carriers 22 to 27 are positioned on the table 12 immovably to a large extent and, except for the movements in the main axis direction, virtually do not perform any movements (feed motion, delivery movement or similar movements). This allows a simple, low-cost and standardized, yet nonetheless stable structure with low elasticities (pressing segments, jointing segments, testing and interrogating segments, etc.). In addition, an automatic tool exchange system can be integrated very easily.

Each module 2 to 5 has its own protection device, with a self-supporting safety circuit and an IPC-control of its own for monitoring and controlling the machines. This self-supporting system can be crosslinked, however, to an electronic control station by way of a bus system.

The completely self-supporting design allows flexibly adapting to changed tasks of manufacture. In particular, it is possible to quickly exchange tools, tool inserts and the like, when the manufacturing module 6 to 9 includes standardized slide-in accommodations (e.g. for the purpose of extension, change of design, repair, or the like).

The X/y-CNC-servo axis systems can have an exchangeable modules design in order to be flexible also in this respect. For example, the following is feasible:
  1. x- or y-pneumatic axis with two fixed end positions: workpiece carrier transfer with two fixed machining positions or only passage of the workpiece carrier from place A to place B
  2. Y-CNC-axis: workpiece carrier transfer and flexible machining position in the Y-direction
  3. X-Y-double axis system: workpiece carrier transfer and highly flexible positioning for machining without fixed end positions in the X- and Y-direction.

At least one aspect of the invention is as follows:

A CNC-servo axis system is used to position workpiece carriers 22 to 27 with workpiece WS in a manufacturing module 6 to 9 in a self-supporting fashion. The same system also fulfils transfer tasks, i.e. taking-in, transfer within the transfer line system 1, and exhaust from the system. The workpiece carrier 22 to 27 is indexed in each position by this system in a defined manner. Machining forces are introduced directly into the table 12 of each module 6 to 9. Each manufacturing module 6 to 9 has its own, secured protection device and a self-supporting electronic control (IPC). The communication and synchronisation among several manufacturing modules 6 to 9 within a machining segment takes place via bus systems. The data transfer between manufacturing modules 6 to 9 and the control station (master computer) relating to test and machine parameters such as especially the measured values of nominal/actual values monitoring including the operating cycles and the data transfer between the individual modules takes place via the bus system.

LIST OF REFERENCE NUMERALS 1 transfer system
2 module
3 module
4 module
5 module
6 manufacturing module
7 manufacturing module
8 manufacturing module
9 manufacturing module
10 tool holding fixture
11 drive
12 table
13 servo drive
14 servo drive
15 servo drive
16 guide
17 guide
18 guide
19 guide
20 guide
21 guide
22 workpiece carrier
23 workpiece carrier
24 workpiece carrier
25 workpiece carrier
26 workpiece carrier
27 workpiece carrier
28 slide
29 slide
30 slide
31 frame
32 profile base
33 column
34 column
35 end plate
36 bearing plate
40 piston-and-cylinder assembly
41 controlling and regulating unit
WS workpiece
X,Y,Z main axis direction

The invention claimed is:

1. A modular transfer system for workpieces comprising:
 (1) at least two manufacturing modules which are identical in their leading dimensions, each manufacturing module comprising:
  (a) one or more tool mounting fixtures with a drive for tool movement;
  (b) a table for the accommodation of machining forces;
  (c) a servo drive for the purposeful displacement of a workpiece carrier along a first main axis to displace the workpiece carrier with respect to the one or more tool mounting fixtures, and along a second main axis, which differs from the first main axis, to displace the workpiece carrier between adjacent manufacturing modules, within a machining space of a module and for direct transfer of a workpiece carrier between modules without the aid of a conveyor belt;
  (d) an index gripping device associated with a slide of the servo drive that is configured to grip and index the workpiece carrier; and
  (e) one or more switches, sensors or combination thereof, for gathering information related to machines, tools and workpieces, which connect to at least one local electronic controlling and regulating unit;
 (2) interconnections for transmission of energy, information or both between the manufacturing modules; and
 (3) an electronic control station in communication with the controlling and regulating units.

2. The modular transfer system as claimed in claim 1, wherein the tool mounting fixtures are arranged in a stationary or movable manner.

3. The modular transfer system as claimed in claim 1, wherein at least one of the manufacturing modules includes at least one piston-and-cylinder assembly for non-cutting machining of a workpiece.

4. The modular transfer system as claimed in claim 1, wherein at least one of the manufacturing modules includes at least one tool storage unit and means for the exchange of tools.

5. The modular transfer system as claimed in claim 1, wherein a feed system for parts is connected to at least one of the manufacturing modules.

6. The modular transfer system as claimed in claim 1, wherein at least one of the manufacturing modules includes one or more parallel arranged handling and assembling robots, which independently take workpieces, components to be machined or a combination thereof from a parts storage unit and transfer the components to a desired location within the transfer system.

7. The modular transfer system as claimed in claim 6, wherein the handling and assembling robots are attached to a frame of the manufacturing module.

8. The modular transfer system as claimed in claim 1, wherein at least one of the manufacturing modules includes a frame installed on the table of a manufacturing module, and the frame comprises at least two columns and at least one end plate to accommodate column ends.

9. The modular transfer system as claimed in claim 8, wherein opposite column ends are received directly in the table of the manufacturing module or in a base plate of the frame.

10. The modular transfer system as claimed in claim 1, wherein at least one of the manufacturing modules includes a slide that is equipped with holding or coupling means for the workpiece carrier.

11. The modular transfer system as claimed in claim 10, wherein the holding means includes two points of fixation by means of which the workpiece carrier is attached to the movable slide in the x- and y-main axis direction, and in that the workpiece carrier abuts on the table in the z-main axis direction.

12. The modular transfer system as claimed in claim 10, wherein the holding means are cylindrical pins which engage into recesses at the workpiece carrier in the z-main axis direction.

13. The modular transfer system as claimed in claim 1, wherein the workpiece carrier includes spring-loaded, pneumatic, hydraulic, or electromagnetic workpiece clamping means.

14. The modular transfer system as claimed in claim 1, wherein the workpiece carrier includes coupling means to connect to an energy bus or an information bus of the transfer system.

15. The modular transfer system as claimed in claim 1, wherein the workpiece carrier includes one or more transducers, switches, sensors or a combination thereof.

16. The modular transfer system as claimed in claim 10, wherein the slide includes coupling means for connecting to coupling means of the workpiece carrier, and the coupling means are automatically fixed between the slide and workpiece carrier, or detached therefrom.

17. The modular transfer system as claimed in claim 1, wherein at least one manufacturing module includes an optical or electronic picture processing system.

18. The modular transfer system as claimed in claim 1, wherein each manufacturing module includes an energy bus and an information bus.

19. The modular transfer system as claimed in claim 18, wherein the transfer system has a modular design including several manufacturing modules arranged in series-connection according to a defined layout, with the manufacturing modules being provided with mechanical coupling means, coupling means for the energy bus, and coupling means for the information bus, or combination thereof.

20. The modular transfer system as claimed in claim 19, wherein the coupling means are configured in such a way that they can be released and locked without the use of tools.

21. The modular transfer system as claimed in claim 1, wherein each of the manufacturing modules have an identical design, and an adaptation of manufacture or change in manufacture is performed by means of a program loading operation from the electronic control station or by additionally exchanging a manufacturing module.

22. A modular transfer system for workpieces comprising:
  (1) at least two manufacturing modules which are identical in their leading dimensions, each manufacturing module comprising:
    (a) one or more tool mounting fixtures with a drive for tool movement;
    (b) a table for the accommodation of machining forces;
    (c) a servo drive for the purposeful displacement of a workpiece carrier along a first main axis to displace the workpiece carrier with respect to the one or more tool mounting fixtures, and along a second main axis, which differs from the first main axis, to displace the workpiece carrier between adjacent manufacturing modules, within a machining space of a module and for direct transfer of a workpiece carrier between modules without the aid of a conveyor belt; and
    (d) one or more switches, sensors or combination thereof, for gathering information related to machines, tools and workpieces, which connect to at least one local electronic controlling and regulating unit;
  (2) interconnections for transmission of energy, information or both between the manufacturing modules; and
  (3) an electronic control station in communication with the controlling and regulating units,
  wherein the servo drive of a first manufacturing module is configured to (i) retrieve a workpiece from a second manufacturing module that is positioned adjacent to the first manufacturing module, (ii) transport the workpiece to a machining space of the first manufacturing module to undergo a machining operation, and (iii) deliver the workpiece to a third manufacturing module that is positioned adjacent to the first manufacturing module following the machining operation to be retrieved by the servo drive of the third manufacturing module.

* * * * *

UNITED STATES PATENT AND TRADEMARK OFFICE
CERTIFICATE OF CORRECTION

PATENT NO.       : 8,397,375 B2                                               Page 1 of 1
APPLICATION NO.  : 11/547538
DATED            : March 19, 2013
INVENTOR(S)      : Mertens et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1657 days.

Signed and Sealed this
First Day of September, 2015

Michelle K. Lee
*Director of the United States Patent and Trademark Office*